(12) United States Patent
Medeiros et al.

(10) Patent No.: US 12,009,852 B2
(45) Date of Patent: Jun. 11, 2024

(54) HARD HAT COMMUNICATION SYSTEM

(71) Applicant: Evitavonni Construction Group Inc., New Tecumseh (CA)

(72) Inventors: Phillip Medeiros, New Tecumseh (CA); Jamaal Bond, Toronto (CA)

(73) Assignee: Evitavonni Construction Group Inc., New Tecumseh (CA)

( * ) Notice: Subject to any disclaimer, the term of this patent is extended or adjusted under 35 U.S.C. 154(b) by 339 days.

(21) Appl. No.: 17/595,850

(22) PCT Filed: May 26, 2020

(86) PCT No.: PCT/CA2020/050717
§ 371 (c)(1),
(2) Date: Nov. 27, 2021

(87) PCT Pub. No.: WO2020/237370
PCT Pub. Date: Dec. 3, 2020

(65) Prior Publication Data
US 2022/0239324 A1 Jul. 28, 2022

Related U.S. Application Data

(60) Provisional application No. 62/853,085, filed on May 27, 2019.

(51) Int. Cl.
*H04B 1/3827* (2015.01)
*A42B 3/04* (2006.01)
*A42B 3/30* (2006.01)
*H04R 1/08* (2006.01)

(52) U.S. Cl.
CPC ........... *H04B 1/385* (2013.01); *A42B 3/0406* (2013.01); *A42B 3/30* (2013.01); *H04R 1/08* (2013.01)

(58) Field of Classification Search
CPC ........ H04B 1/385; H04B 7/26; A42B 3/0406; A42B 3/30; H04R 1/08
See application file for complete search history.

(56) References Cited

U.S. PATENT DOCUMENTS 4,152,553 A * 5/1979 White ...................... A42B 3/30
379/430

FOREIGN PATENT DOCUMENTS

CN 105996273 A * 10/2016
WO WO-2016094582 A1 * 6/2016

* cited by examiner

*Primary Examiner* — Farid Seyedvosoghi
(74) *Attorney, Agent, or Firm* — Orin Del Vecchio

(57) ABSTRACT

The present invention relates to a hard hat, comprising: a rigid outer shell, a vibration transducer secured to the exterior of the rigid outer shell, the vibration transducer operative to vibrate the rigid outer shell when active; and a control system coupled to the hard hat, the control system further operably coupled to the vibration transducer such that the control system controls vibration of the vibration transducer. The control system converts received audio communication into a signal sent to the vibration transducer such that activation of the vibration transducer results in vibration of the rigid outer shell, with the rigid outer shell thereby acting as a harmonic resonance acoustic chamber replicating the received audio communication. A kit for converting a hard hat and a method of communication are also disclosed.

15 Claims, 6 Drawing Sheets

HARD HAT COMMUNICATION SYSTEM

FIELD OF THE INVENTION

The present specification relates generally to an improved hard hat, and more particularly to an improved hard hat incorporating an audio communication system.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Hard hats are items of protective equipment worn in hazardous locations such as construction sites and mining operations. Hard hats are designed to protect the wearer from injury due to impact from falling objects (tools, debris, etc.) as well as from contact with low ceilings or beams. A standard hard hat consists of a rigid outer plastic shell 9historically metal and fiberglass were also used) with an internal suspension mechanism (generally straps and/or foam) which secures the hard hat on the user's head as well as providing an air gap to the outer shell for protective purposes. Hard hats typically have a front brim for additional protection and may include other features depending on the intended operating environment, such as headlamps, earflaps, chinstraps, and visors. Hard may be color-coded for identification and may further include locations for mounting stickers or logos.

However, a recurring issue in the working environment where hard hats are common is the presence of substantial elevated acoustic interference from operating equipment and tools. This interference generally acts to inhibit audio communication in the working environment. Workers attempting to hear audio communication over a radio or phone may not be able to do so as a result of competing with the interference from the working environment. Attempting to increase volume has limits and may still be ineffective in very loud environments.

As a consequence, workers may choose to wear earbuds or earphones or similar devices to facilitate receiving audio communication, however, these workers are then faced with a reduced ability to hear ambient noise and warnings in the working environment. Other alternatives include mounting speaker devices onto a hard hat to increase proximity to the user's ear. However, external speakers still suffer from the limitations of volume increase as discussed above.

While there are some attempts known in the art to address the environmental communications issues, it would be desirable to have a hard hat with an attached communications system which mitigates some of the disadvantages that continue to exist.

Accordingly, there remains a need for improvements in the art.

SUMMARY OF THE INVENTION

In accordance with an aspect of the invention, there is provided an improved hard hat incorporating an audio communication system.

According to an embodiment of the invention, there is provided a hard hat, comprising a rigid outer shell, the rigid outer shell dimensioned to cover a human head; a vibration transducer secured to the exterior of the rigid outer shell, the vibration transducer operative to vibrate the rigid outer shell when active; and a control system coupled to the hard hat, the control system further operably coupled to the vibration transducer such that the control system controls vibration of the vibration transducer. The control system converts received audio communication into a signal sent to the vibration transducer such that activation of the vibration transducer results in vibration of the rigid outer shell, with the rigid outer shell thereby acting as a harmonic resonance acoustic chamber replicating the received audio communication.

According to a further embodiment of the invention, the vibration transducer may be comprised of a pair of individual vibration transducers, each individual vibration transducer secured on opposing sides of the rigid outer shell. The control system may operate via one or more of: Bluetooth, cellular and radio. The hard hat may further comprise a microphone operably coupled to the control system enabling return audio communication via the control system. The control system may be coupled to a brim on the rigid outer shell.

According to another embodiment of the invention, there is provided a method for providing audio communication via a hard hat with a rigid outer shell, comprising: receiving, at a control system coupled to the hard hat, an audio communication; converting, via the control system, the audio communication into a signal; transmitting the signal to a transducer operably coupled to the audio communications system, the signal thereby causing the transducer to vibrate and replicating the audio communication via vibration of the rigid outer shell resulting from vibration of the transducer. The rigid outer shell acts as a harmonic resonance acoustic chamber while vibrating.

According to a further embodiment of the invention the vibration transducer may be comprised of a pair of individual vibration transducers, each individual vibration transducer secured on opposing sides of the rigid outer shell. The control system may operate via one or more of: Bluetooth, cellular and radio. The hard hat may further comprise a microphone operably coupled to the control system enabling return audio communication via the control system. The control system may be coupled to a brim on the rigid outer shell.

According to still another embodiment of the invention, there is provided a kit for an audio communications system for a hard hat with a rigid outer shell, comprising: a vibration transducer securable to the exterior of the rigid outer shell, the vibration transducer operative to vibrate the rigid outer shell when active; a control system securable to the hard hat, the communications system further operably coupled to the vibration transducer such that the control system controls vibration of the vibration transducer. The control system converts received audio communication into a signal sent to the vibration transducer such that activation of the vibration transducer results in vibration of the rigid outer shell, with the rigid outer shell thereby acting as a harmonic resonance acoustic chamber replicating the received audio communication.

According to a further embodiment of the invention the vibration transducer may be comprised of a pair of individual vibration transducers, each individual vibration transducer securable to opposing sides of the rigid outer shell. The control system may operate via one or more of: Bluetooth, cellular and radio. The kit may further comprise a microphone operably coupled to the control system enabling return audio communication via the control system. The control system may be couplable to a brim on the rigid outer shell.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates generally to an improved hard hat, and more particularly to an improved hard hat incorporating an audio communication system.

Figure 1:
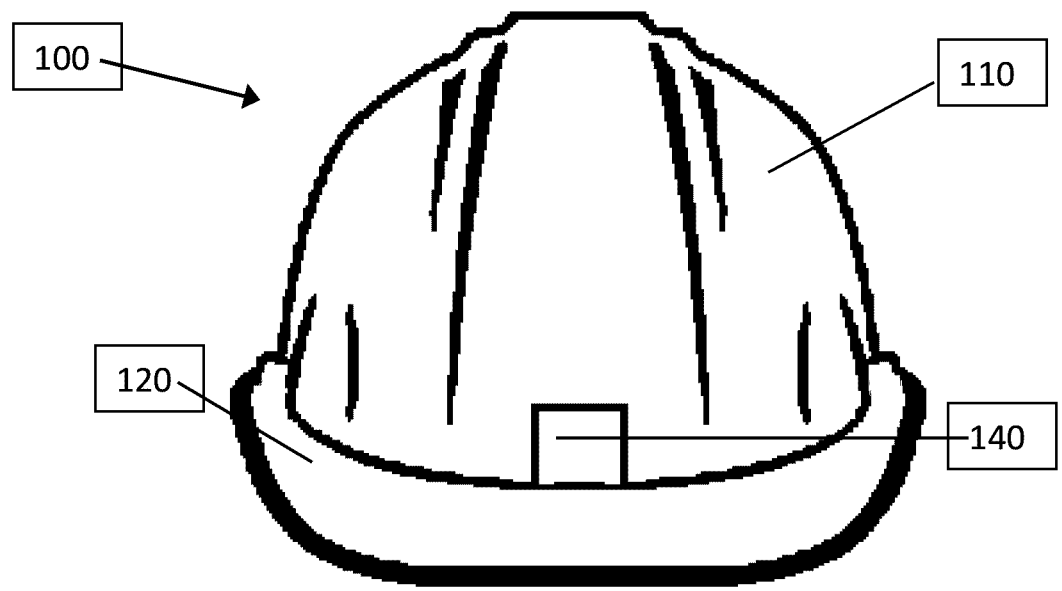
FIG. 1 is a top view of a hard hat according to an embodiment.
Figure 2:
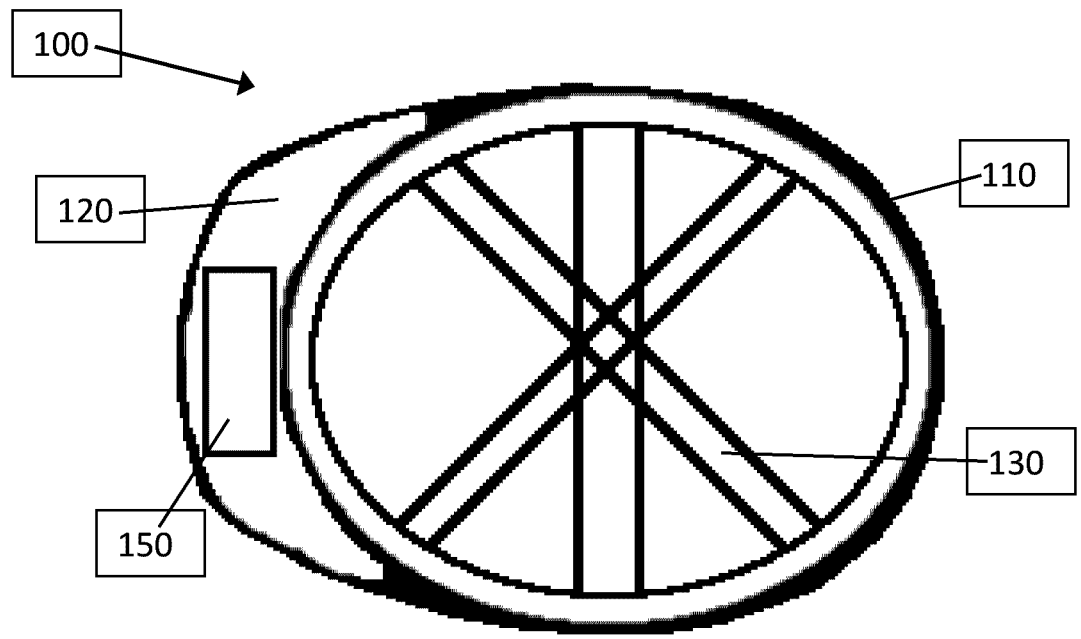
FIG. 2 is a bottom view of the hard hat of FIG. 1.
Figure 3:
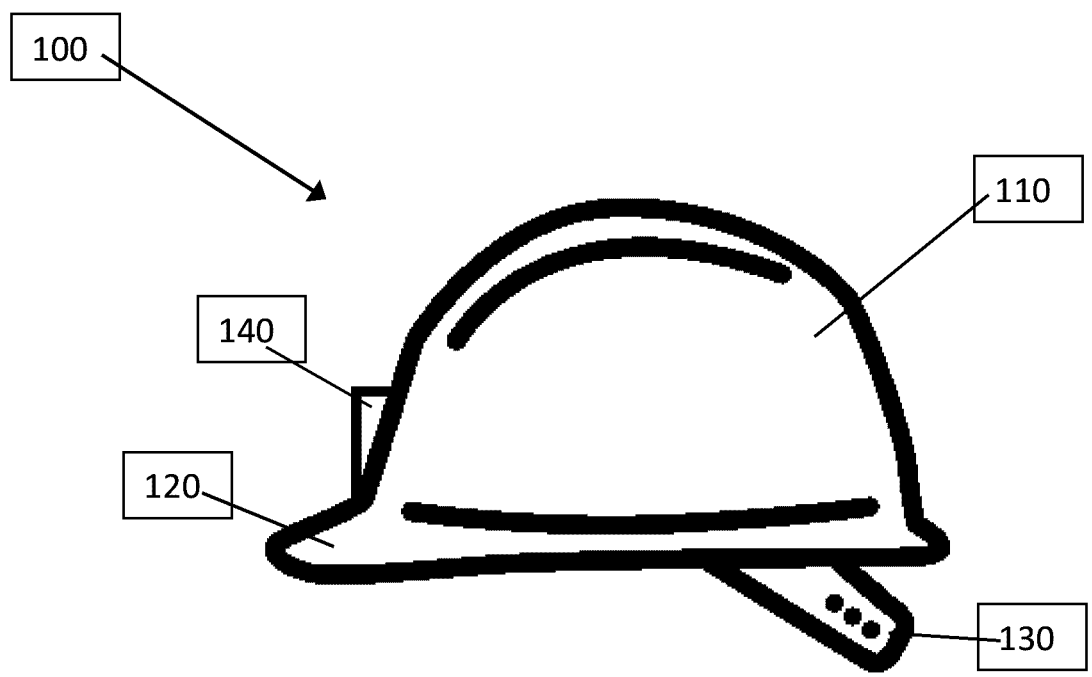
FIG. 3 is a side view of the hard hat of FIG. 1.

According to an embodiment as shown in FIGS. 1-3, a hard hat 100 is comprised of a rigid outer shell 110 formed from plastic (e.g. HDPE) or a similar material, with a brim 120 and an internal set of suspension bands 130 which support the outer shell 110 on and spaced away (approximately 0.8 to 1.2 inches) from the user's head. The overall shape and design of outer shell 110 follows the requirements for the anticipated working environment, as known in the art.

A vibration transducer 140 is coupled to the exterior of the outer shell 110 such that activation of the vibration transducer 140 results in vibration of outer shell 110. As shown in FIG. 1, the vibration transducer 140 is mounted at the front of outer shell 110, however other positions such as the rear or sides may be used. While a top-mounted position is expected to function, it may be discouraged due to risk of damage from anticipated impact to that location of the outer shell 110 during typical use. The vibration transducer 140 is secured to the exterior of the outer shell 110 to direct the vibration effect to the interior of the outer shell 110 as well as to inhibit any compromising of the protective qualities of the hard hat 100.

A communication system 150 is further coupled to the outer shell 110 and operably coupled to vibration transducer 140. The communication system 150 receives audio communication and activates the vibration transducer 140 accordingly. Vibration transducer 140 then causes outer shell 110 to vibrate and act as a harmonic resonance acoustic chamber, resulting in the audio communication becoming audible to the user. The user thereby receives the audio communication at an audible level without any interference in the user's ability to hear noises or warnings in their nearby environment. Further, the communication system 150 may activate automatically on receiving a communication, thus further eliminating the need for the user to use their hands for activation, which may not be possible in all situations and environments.

Figure 4:
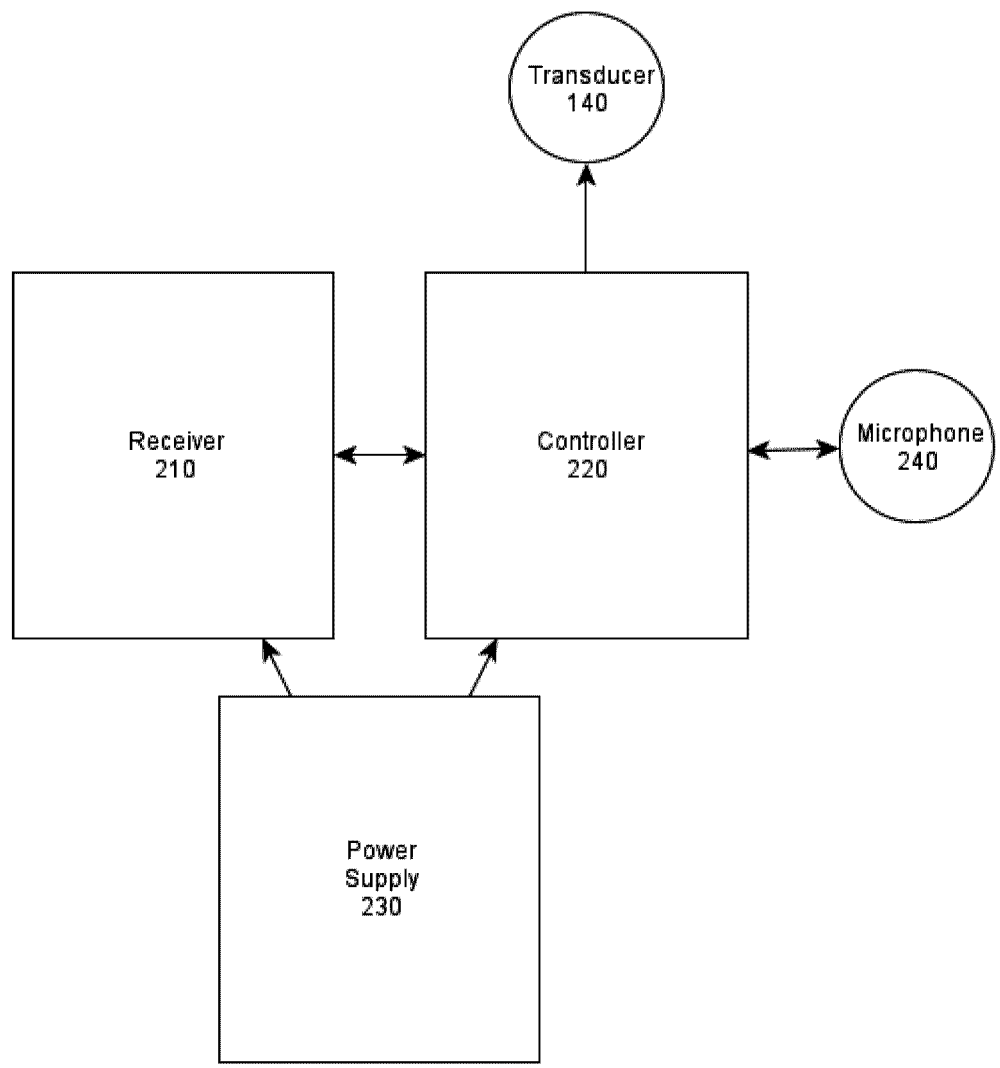
FIG. 4 is a schematic of a control system according to an embodiment.

Referring to FIG. 4, communication system 150 is comprised of a receiver 210, a controller 220 and a power supply 230. Optionally, a microphone 240 may also be included. The controller 220 is operably coupled to the transducer 140 and controls the activation and vibration frequency of the transducer 140.

Figure 5:
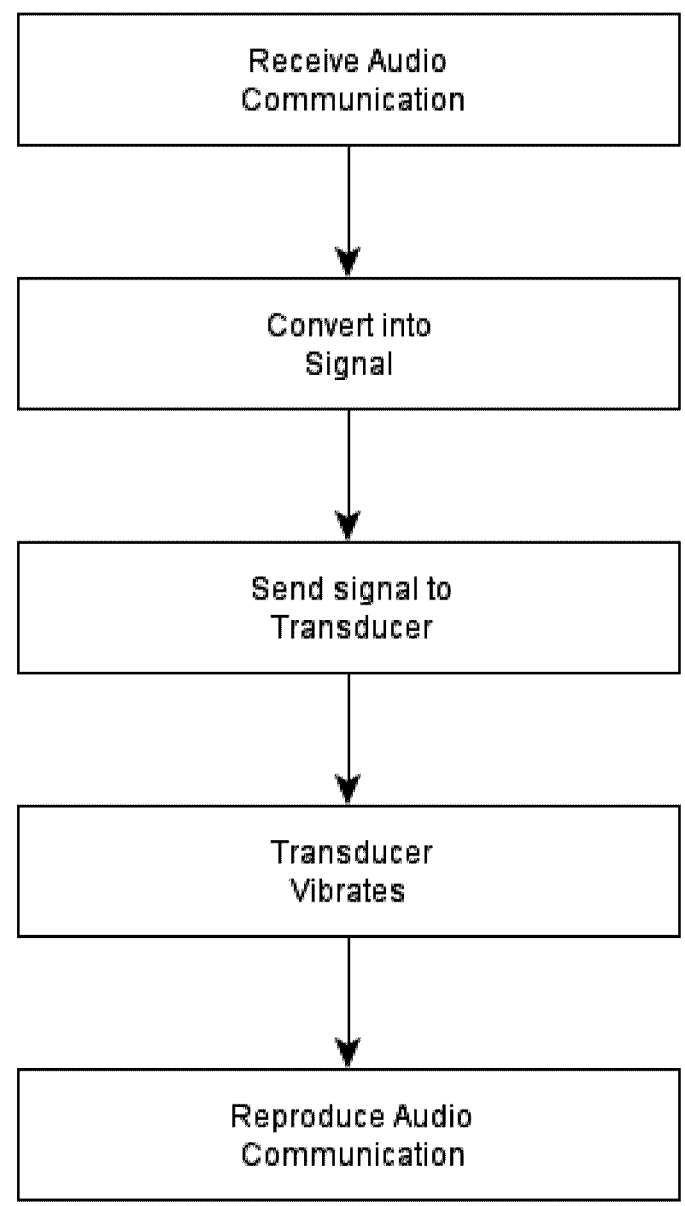
FIG. 5 is a flowchart of a communication process according to an embodiment.

Referring to FIG. 5, the receiver 210 receives audio communication sent to the wearer of the hard hat 100, either directly to the receiver 210, or sent to a device held or worn by the wearer and from that device to the receiver. The receiver 210 may use the Bluetooth communication protocol to connect to another device held or worn by the wearer, such as a radio or cellular phone. Alternatively, the receiver 210 may operate via cellular or radio to receive direct audio communication. As yet another alternative, the receiver 210 may be capable of operating using different protocols as selected by the wearer. The receiver 210 may operate in a passive mode, reacting to detected audio communication enabling hands-free operation, which may be necessary in some working environments. If a microphone 240 is present, it may be operated in the same manner, where possible. Alternatively, microphone 240 may activate only on a specific work or phrase spoken by the wearer, to prevent accidental activation.

The controller 220 is then operative to convert the audio communication into a signal which is sent to the transducer 140. The transducer 140 thereby vibrates according to the received signal, reproducing the audio communication by converting the rigid outer shell 110 into a harmonic resonance acoustic chamber. The wearer may then listen to the replicated audio communication without any impediment to receiving or detecting audio noises in their ambient environment, thereby improving safety.

The power supply 230 provides power for the receiver 210, controller 220 and transducer 140. The power supply is preferably battery-based, with the batteries being replaceable or rechargeable, as desired. Rechargeable batteries may be removable or permanent. Permanent rechargeable batteries may include a port on the power supply 230 to provide power for charging. Alternatively, or additionally, the hard hat 100 may include solar panels 160 for charging batteries during storage or use under appropriate conditions.

The communication system 150 may further include any additional controls and components required for operation. Such controls may include an on/off switch, a pairing switch for Bluetooth devices, and indicators for power, battery charge and pairing. Where additional components that require controls and/or power are integrated into hard hat 100, such as a headlamp, these controls may also be included with communication system 150, and may also use power supply 230, if needed. In such cases, either or both of communication system 150 and power supply 230 may include ports to allow for the operable connection of additional components.

Figure 8:
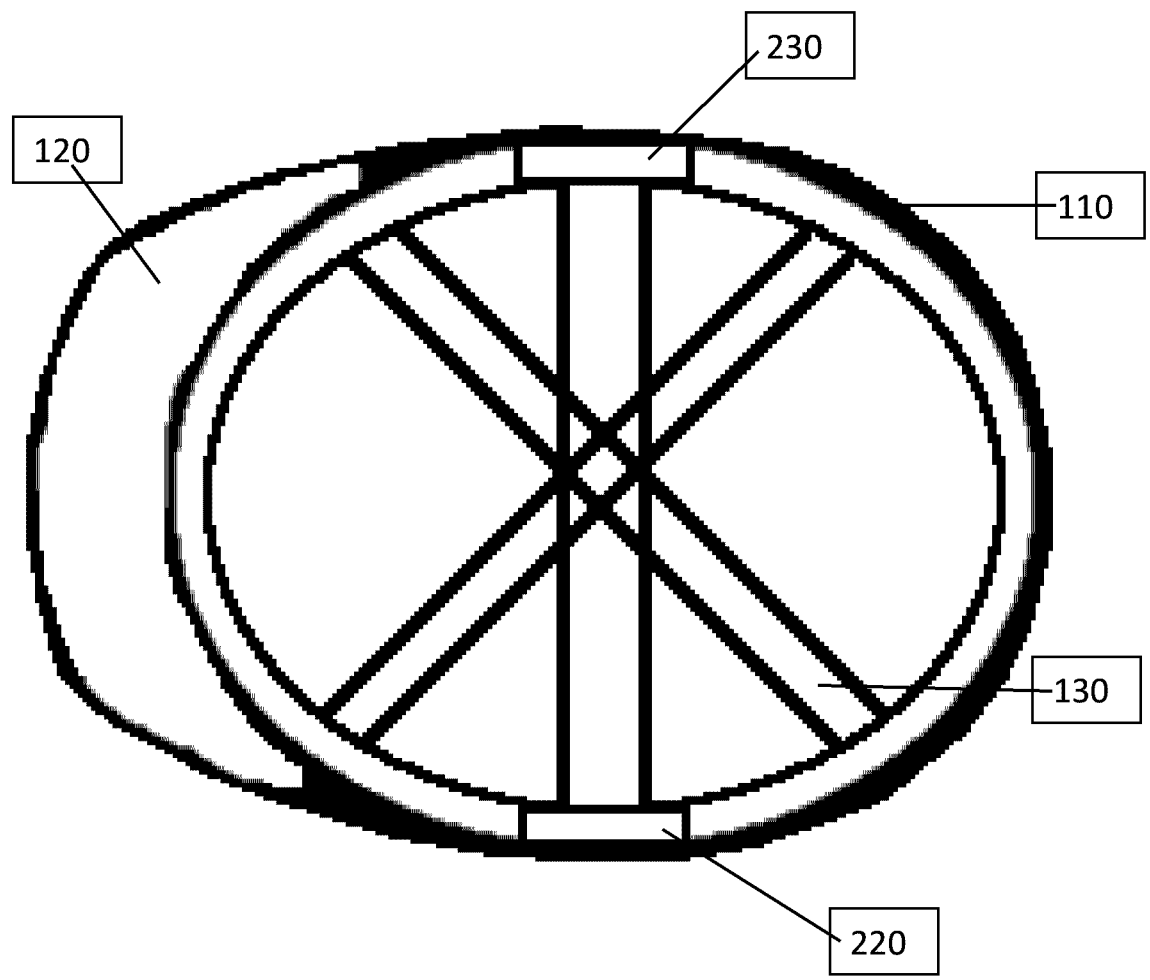
FIG. 8 is a bottom view of a hard hat according to an embodiment.

The communication system 150 is secured to the outer shell 110 in such a way as to not interfere with the protective qualities of the hard hat 100. Possible configurations may include securing the communication system 150 under the brim 120 of the hard hat 100, which also enables the wearer to easily access and view any controls and indicators that are part of the communication system 150. Another configuration would locate the communication system 150 on the exterior on one of the sides of the hard hat 100. Additionally, components of the communication system 150 may be separately positioned to reduce space requirements or provide ease of access. For example, the receiver 210 and controller 220 may be located on one side of the hard hat 100 and the power supply 230 located on the opposite side of hard hat 100 as shown in FIG. 8.

Figure 6:
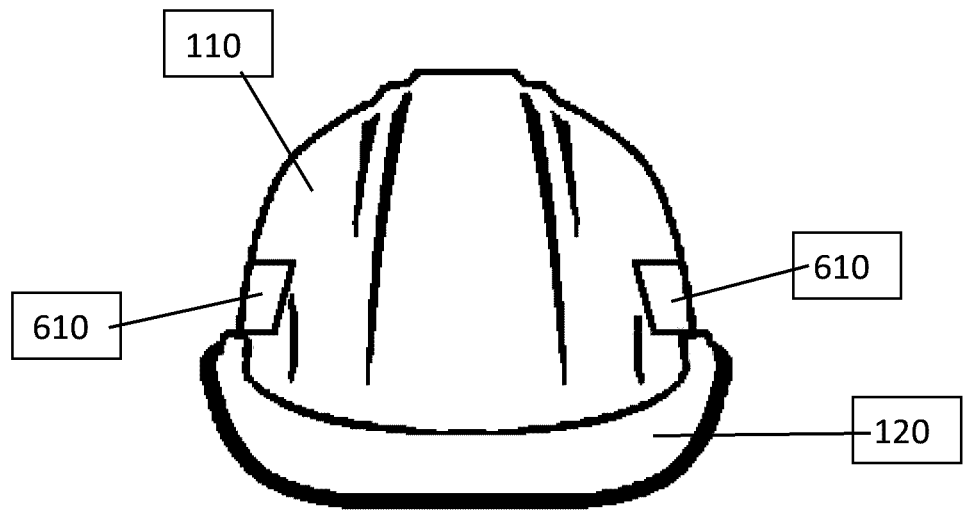
FIG. 6 is a top view of a hard hat according to an embodiment.
Figure 7:
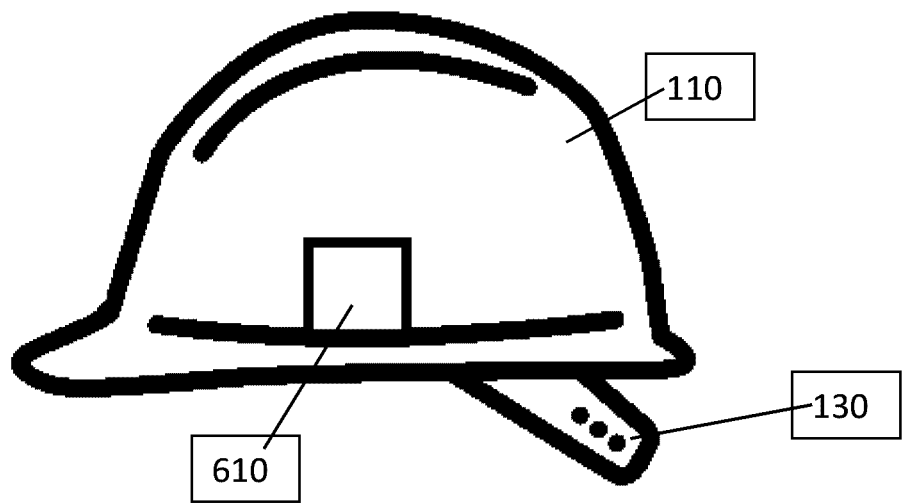
FIG. 7 is a side view of the hard hat of FIG. 6.

In an alternative embodiment, as shown in FIGS. 6 and 7, transducer 140 may be comprised of two separate transducers 610, each mounted on opposite sides of rigid outer shell 110. The separate transducers 610 thereby may be operated in concert to provide a stereo-like effect to the harmonic acoustic resonance chamber created within rigid outer shell 110.

The transducer 140 and components of the communication system 150 may further be provided with protective covers to prevent damage from weather, debris and other environmental hazards. Additionally, transducer 140 and component of the communication system 150 may be constructed as sealed units to prevent damage.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A hard hat, comprising:
    a rigid outer shell without a lining, the rigid outer shell dimensioned to cover a human head and supported away from the head by one or more suspension bands;
    a vibration transducer secured to the exterior of the rigid outer shell, the vibration transducer operative to vibrate the rigid outer shell when active without contacting the head;
    a control system coupled to the hard hat below the perimeter of the outer shell, the control system further operably coupled to the vibration transducer such that the control system controls vibration of the vibration transducer, the control system comprising at least a power supply for the transducer and a signal receiver,
    wherein the control system converts received audio communication at the signal receiver into a signal sent to the vibration transducer such that activation of the vibration transducer results in direct vibration of the rigid outer shell without any direct vibration of the head, with the combination of the transducer and rigid outer shell creating a harmonic resonance acoustic chamber replicating the received audio communication.

2. The hard hat of claim 1, wherein the operable coupling between the vibration transducer and the control system passes through the rigid outer shell.

3. The hard hat of claim 1, wherein the signal receiver receives the audio communication using one or more of: Bluetooth, cellular and radio.

4. The hard hat of claim 1, further comprising a microphone operably coupled to the control system enabling return audio communication via the control system.

5. The hard hat of claim 1, wherein the control system is proximate an ear of a wearer when the hard hat is worn.

6. A method for providing audio communication via a hard hat with a rigid outer shell without a lining, comprising:
    receiving, at a control system coupled to the hard hat below the perimeter of the outer shell, an audio communication, the control system comprising at least a power supply for a transducer and a signal receiver;
    converting, via the signal receiver, the audio communication into a signal;
    transmitting the signal to the transducer operably coupled to the control system, the signal thereby causing the transducer to vibrate without contacting the head and
    replicating the audio communication via direct vibration of the rigid outer shell without any direct vibration of the head resulting from vibration of the transducer,
    wherein the combination of the transducer and the rigid outer shell acts as a harmonic resonance acoustic chamber while vibrating.

7. The method of claim 6, wherein the operable coupling between the vibration transducer and the control system passes through the rigid outer shell.

8. The method of claim 6, wherein the signal receiver receives the audio communication using one or more of: Bluetooth, cellular and radio.

9. The method of claim 6, further comprising enabling return audio communication via a microphone operably coupled to the control system.

10. The method of claim 6, wherein the control system is proximate an ear of a wearer when the hard hat is worn.

11. A kit for an audio communications system for a hard hat with a rigid outer shell without a lining, comprising:

a vibration transducer securable to the exterior of the rigid outer shell, the vibration transducer operative to vibrate the rigid outer shell without contacting the head when active;

a control system securable to the hard hat below the perimeter of the outer shell, the control system further operably coupled to the vibration transducer such that the control system controls vibration of the vibration transducer, the control system comprising at least a power supply for the transducer and a signal receiver, wherein the control system converts received audio communication at the signal receiver into a signal sent to the vibration transducer such that activation of the vibration transducer results in direct vibration of the rigid outer shell without any direct vibration of the head, with the combination of the transducer and the rigid outer shell thereby acting as a harmonic resonance acoustic chamber replicating the received audio communication.

12. The kit of claim 11, wherein the operable coupling between the vibration transducer and the control system passes through the rigid outer shell.

13. The kit of claim 11, wherein the signal receiver receives the audio communication using one or more of: Bluetooth, cellular and radio.

14. The kit of claim 11, further comprising a microphone operably coupled to the control system enabling return audio communication via the control system.

15. The kit of claim 11, wherein the control system is proximate an ear of a wearer when the hard hat is worn.

* * * * *